United States Patent
Shin et al.

(10) Patent No.: US 12,479,434 B2
(45) Date of Patent: Nov. 25, 2025

(54) METHOD OF CONTROLLING CHARGING BY MOTOR TO IMPROVE FUEL EFFICIENCY OF HYBRID VEHICLE

(71) Applicants: Hyundai Motor Company, Seoul (KR); Kia Corporation, Seoul (KR)

(72) Inventors: Dong-Jun Shin, Hwaseong-Si (KR); Tae-Hyeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 195 days.

(21) Appl. No.: 18/238,401

(22) Filed: Aug. 25, 2023

(65) Prior Publication Data
US 2024/0308517 A1  Sep. 19, 2024

(30) Foreign Application Priority Data
Mar. 17, 2023  (KR) .................. 10-2023-0035112

(51) Int. Cl.
*B60W 30/18* (2012.01)
*B60W 10/02* (2006.01)
(Continued)

(52) U.S. Cl.
CPC ...... *B60W 30/18127* (2013.01); *B60W 10/02* (2013.01); *B60W 10/06* (2013.01); *B60W 10/08* (2013.01); *B60W 10/188* (2013.01); *B60W 20/14* (2016.01); *B60W 2510/244* (2013.01); *B60W 2540/12* (2013.01); *B60W 2710/021* (2013.01); *B60W 2710/0627* (2013.01);
(Continued)

(58) Field of Classification Search
CPC .......... B60W 30/18127; B60W 10/02; B60W 10/06; B60W 10/08; B60W 10/188; B60W 20/14; B60W 2510/244; B60W 2540/12; B60W 2710/021; B60W 2710/0627; B60W 2710/0666; B60W 10/18; B60W 20/15; B60W 2710/08; Y02T 10/62; B60K 6/48; B60Y 2200/92
USPC ......................................... 701/70
See application file for complete search history.

(56) References Cited

U.S. PATENT DOCUMENTS

| | | | |
|---|---|---|---|
| 2010/0181125 A1* | 7/2010 | Wang | B60L 58/20 180/65.21 |
| 2018/0257634 A1* | 9/2018 | Zhao | B60W 10/06 |
| 2020/0148186 A1* | 5/2020 | Zhu | B60T 8/4081 |

FOREIGN PATENT DOCUMENTS

KR  10-2456071 B1  10/2022

* cited by examiner

Primary Examiner — Yi-Kai Wang
(74) Attorney, Agent, or Firm — Morgan Lewis & Bockius LLP

(57) ABSTRACT

In a method of controlling charging by a motor to improving fuel efficiency of a hybrid vehicle, at least one of turning-on of an engine, turning-off thereof, engagement of an engine clutch, disengagement thereof, performing of charging by P0 and P1 motors, and non-performing of charging by the P0 and P1 motors are selectively combined. In addition to regenerative braking energy recovered by the third motor, regenerative braking energy is recovered by a P0 motor, P1 motor, and a combination of the P0 and P1 motors according to a level of deceleration of the hybrid vehicle that varies with braking power and braking time, and an energy storage system is charged with the recovered regenerative braking energy. Control of charging by each of the P2, P0, and P1 motors is optimized as variable control on a per-deceleration level basis that varies with a level of a power required for braking.

20 Claims, 9 Drawing Sheets

(51) Int. Cl.
*B60W 10/06* (2006.01)
*B60W 10/08* (2006.01)
*B60W 10/188* (2012.01)
*B60W 20/14* (2016.01)

(52) U.S. Cl.
CPC ............... *B60W 2710/0666* (2013.01); *B60W 2710/083* (2013.01)

FIG. 6

| CONTROL CASE | ENGINE CLUTCH | ENGINE TORQUE | USE OF FUEL | FLOW OF ENERGY |
|---|---|---|---|---|
| ① | DISENGAGED | NOT OUTPUT | X | |

FIG. 7

| CONTROL CASE | ENGINE CLUTCH | ENGINE TORQUE | USE OF FUEL | FLOW OF ENERGY |
|---|---|---|---|---|
| ② | ENGAGED | 0Nm CONTROL | O | on (OUTPUT TORQUE=0) ENGINE CLUTCH close<br>1 — Engine — P1 Motor — ‖ — P2 Motor — T/M — G<br>ENGINE FRICION NOT OCCURRNCE OF LOSS<br>12, 2, 6, 4b<br>P0 Motor → Battery 5<br>4a |

FIG. 9

| CONTROL CASE | ENGINE CLUTCH | ENGINE TORQUE | USE OF FUEL | FLOW OF ENERGY |
|---|---|---|---|---|
| ③ | ENGAGED | NOT OUTPUT | X (fuel-cut) | Fuel-cut / ENGINE CLUTCH close / Engine(1) — P1 Motor(4b) — 12 — P2 Motor(2) — T/M(6) — G / ENGINE FRICION OCCURRNCE OF LOSS / P0 Motor(4a) / Battery(5) |

METHOD OF CONTROLLING CHARGING BY MOTOR TO IMPROVE FUEL EFFICIENCY OF HYBRID VEHICLE

CROSS-REFERENCE TO RELATED APPLICATION

The present application claims priority to Korean Patent Application No. 10-2023-0035112, filed on Mar. 17, 2023, the entire contents of which is incorporated herein for all purposes by this reference.

BACKGROUND OF THE PRESENT DISCLOSURE

Field of the Present Disclosure

The present disclosure relates to control of charging by a motor of a hybrid vehicle, and more particularly, to a method of controlling charging by a motor to improve fuel efficiency of a hybrid vehicle, the method being capable of optimizing recovery of regenerative braking energy by controlling each of the motors according to a deceleration level that varies with power required for braking.

Description of Related Art

Usually, hybrid vehicles drive in an electric vehicle (EV) mode which is a typical electric vehicle mode in which only vehicle driving power of an electric motor (drive motor) is used, and in a hybrid electric vehicle (HEV) mode in which a rotation force of an engine is used as a primary vehicle driving power and a rotation force of the drive motor is used as a secondary vehicle driving power.

Furthermore, the hybrid vehicles drive in a regenerative braking mode by applying "Motor Torque" expressed in the equation "Total Deceleration Force=Motor Torque+Frictional Force of a Hydraulic Pressure Braking Apparatus."

Therefore, in the regenerative braking mode, a battery is charged with braking and inertia energy which is recovered through generation by the drive motor when the hybrid vehicle performs braking or travels with an inertial force.

A parallel-type hybrid vehicle configured for parallelly transferring vehicle driving power includes an engine (internal combustion engine), two or more electric motors that generate drive power to drive the hybrid vehicle individually or in cooperation with the engine (internal combustion engine), and an energy storage system. In the present parallel-type hybrid vehicle, motors are categorized into motors that are called P0, P1, P2, P3, P4, and so forth, according to where they are positioned in a vehicle powertrain system. A primary motor (that is, the P2 motor) is configured to perform regenerative braking.

However, when performing braking, the parallel-type hybrid vehicle performs charging with regenerative braking energy mostly through control of charging by the P2 motor which is the primary motor. Thus, the regenerative braking energy is recoverable to the extent of permitted charging power by the P2 motor. This imposes a limitation on the recovery of the regenerative braking energy.

Therefore, in a case where power for braking which is required by a driver exceeds a level of possible charging power by the P2 motor, the parallel-type hybrid vehicle performs hydraulic pressure braking using a brake to compensate for a shortage that occurs due to the insufficient permitted charging power by the P2 power.

In the present manner, the parallel-type hybrid vehicle has no choice but to consume exceeding braking power for hydraulic pressure braking due to limitation on charging torque of the P2 motor. Motors, including the P0 motor and the P1 motor, other than the P2 motor are not utilized for regenerative braking.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling charging by a motor to improve fuel efficiency of a hybrid vehicle, the method being configured for optimizing control of charging by each of the first, second and third motors as variable control on a per-deceleration level basis that varies with a level of the power required for braking and of maximally recovering regenerative braking energy which is consumed for hydraulic pressure braking.

To accomplish the above-mentioned object, according to an aspect of the present disclosure, there is provided a method of controlling charging by a motor to improve fuel efficiency of a hybrid vehicle provided with First, second and third motors, the method including: determining, by an iEB, any one of a power required for braking and power permitted for regenerative braking; determining, by an HCU, a deceleration level as a control boundary value which is a combination of limited charging power by a P2 motor, limited charging power by a P0 motor, limited charging power by a P1 motor, and engine friction power; categorizing the control boundary value as any one of "$\alpha$=P2 limited charging power" in a case 1, "$\beta=\alpha$+(P0 limited charging power or P1 limited charging power)" in a case 2, and "$\gamma=\beta$+engine friction power" in a case 3, and selectively combining turning-on of an ICE, turning-off of the ICE, engagement of an engine clutch, disengagement of the engine clutch, non-performing of charging by the first motor and the second motor, and performing of charging by the first motor and the second motor, in accordance with the cases 1, 2, and 3; and performing any one of determination of a power for performing regenerative braking, hydraulic pressure braking, engine torque output, engine clutch control, and motor torque output.

In the method, in the case 1, the HCU may apply the turning-off of the engine, the disengagement of the engine clutch, and the non-performing of charging by the first motor and the second motor, as the selected combination.

In the method, in the case 1, the HCU may compute the power for performing regenerative braking, in accordance with "$\alpha$=P2 limited charging power," the iEB may be configured to determine that a shortage occurring due to the insufficient power for performing the regenerative braking is compensated for through a final hydraulic pressure braking and may perform the final hydraulic pressure braking using a brake, and an MCU may cause the third motor to perform the motor torque output.

In the method, in the case 2, the HCU may apply the turning-on of the engine, the engagement of the engine clutch, and the performing of charging by the first motor and the second motor, as the selected combination.

In the method, in the case 2, the HCU may compute computation of the power for performing regenerative braking, in accordance with "β=α+(P0 limited charging power or P1 limited charging power)," the iEB may be configured to determine that a shortage occurring due to the insufficient power for performing the regenerative braking is compensated for through a final hydraulic pressure braking and may perform the hydraulic pressure braking using the brake, an ECU may perform engine output torque control so that the ICE performs the engine torque output, the HCU may perform engine clutch control so that the engine clutch is engaged, an MCU may cause the first motor, the second motor, and the third motor to perform the motor torque output, and the ECU may be configured for controlling the ICE so that the ICE produces an engine torque of 0 Nm in a state of being turned on.

In the method, in the case 3, the HCU is configured to apply the turning-off of the ICE, the engagement of the engine clutch, and the performing of charging by the first motor and the second motor, as the selected combination.

In the method, in the case 3, the HCU may compute the power for performing regenerative braking, in accordance with ""γ=β+engine power friction," the iEB may be configured to determine that a shortage occurring due to the insufficient power for performing the regenerative braking is compensated for through a final hydraulic pressure braking and may perform the hydraulic pressure braking using the brake, the HCU may perform engine clutch control so that the engine clutch is engaged, an MCU may cause the first motor, the second motor, and the third motor to perform the motor torque output, and the ECU may be configured for controlling the ICE so that the ICE is not supplied with fuel in a state of being turned off.

To accomplish the above-mentioned object, according to another aspect of the present disclosure, there is provided a hybrid vehicle including: a Third motor directly connected to a transmission and configured to perform charging when the hybrid vehicle decelerates; first and second motors directly connected to an ICE; an iEB configured to compute power required for the braking and power permitted for regenerative braking when a driver performs braking, and to perform hydraulic braking to compensate for a shortage occurring due to the insufficient power for performing regenerative braking; an HCU configured to combine limiting charging power by the third motor, limiting charging power by the first motor, limited charging power by the second motor, and engine friction power, to categorize a result of the combination as any one of "α=P2 limited charging power" in a case 1, "β=α+(P0 limited charging power or P1 limited charging power) in a case 2, and "γ=β+engine friction power" in a case 3, to selectively combine turning-on of the ICE, turning-off of the ICE, engagement of an engine clutch, and disengagement of the engine clutch, in according with the cases 1, 2, and 3, and to determine non-performing of charging by the first motor and the second motor or performing charging by the first motor and the second motor; an ECU configured to control the ICE so that the ICE produces an engine torque of 0 Nm in a state of being turned on and that the ICE is not provided with fuel in a state of being turned off, and an MCU configured to control performing of charging by the third motor and the performing of charging by the first motor and the second motor.

In the apparatus, in the case 1, the HCU may apply the turning-off of the ICE, the disengagement of the engine clutch, and the non-performing of charging by the first motor and the second motor, as the selected combination, the power for performing the regenerative braking may be recovered as regenerative braking energy by the third motor, and an energy storage system may be charged with the recovered regenerative braking energy.

In the apparatus, in the case 2, the HCU may apply the turning-on of the ICE, the engagement of the engine clutch, and the performing of charging by the first motor and the second motor, as the selected combination, in addition to recovery of the regenerative braking energy by the third motor, the power for performing the regenerative braking may be recovered as the regenerative braking energy by any of the first motor, the second motor, and a combination of the first motor and the second motor, and the energy storage system may be charged with the recovered regenerative braking energy.

In the apparatus, in the case 3, the HCU may apply the turning-off of the ICE, the engagement of the engine clutch, and the performing of charging by the first motor and the second motor, as the selected combination, in addition to the regenerative braking energy by the third motor, the regenerative braking energy may be recovered by any one of the first motor, the second motor, and the combination of the first motor and the second motor, and the energy storage system may be charged with the recovered regenerative braking energy.

The control of charging by the motor to improve the fuel efficiency of the hybrid vehicle according to an exemplary embodiment of the present disclosure is control of charging by the third motors directly connected to a transmission and the P0 or P1 motor directly connected to an engine at middle and high deceleration levels. by utilizing the first motor and the second motor through the present control of charging, the regenerative braking energy that exceeds a charging limitation of the third motor and thus is consumed without being used for charging may be additionally used for charging, improving the fuel efficiency of the hybrid vehicle. In a state where the engine clutch is engaged, braking power is transferred up to the first motor and the second motor through the third motor. The advantage with the control of charging is that a ratio of contribution by the additionally recovered regenerative braking energy to improving the fuel efficiency is high when compared with a ratio of increasing fuel consumption.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a table illustrating a state of regenerative braking by a P2 motor in a case 1 for control of charging by a motor when the hybrid vehicle according to an exemplary embodiment of the present disclosure performs braking.

FIG. 7 is a table illustrating a state of regenerative braking by the P2 motor and a P0 or a P1 motor in a case 2 for control of charging by a motor when the hybrid vehicle according to an exemplary embodiment of the present disclosure performs braking.

FIG. 9 is a table illustrating a state of regenerative braking by the P2 motor and the P0 and P1 motors in a case 3 for control of charging by a motor when the hybrid vehicle according to an exemplary embodiment of the present disclosure performs braking.

Figure 1:
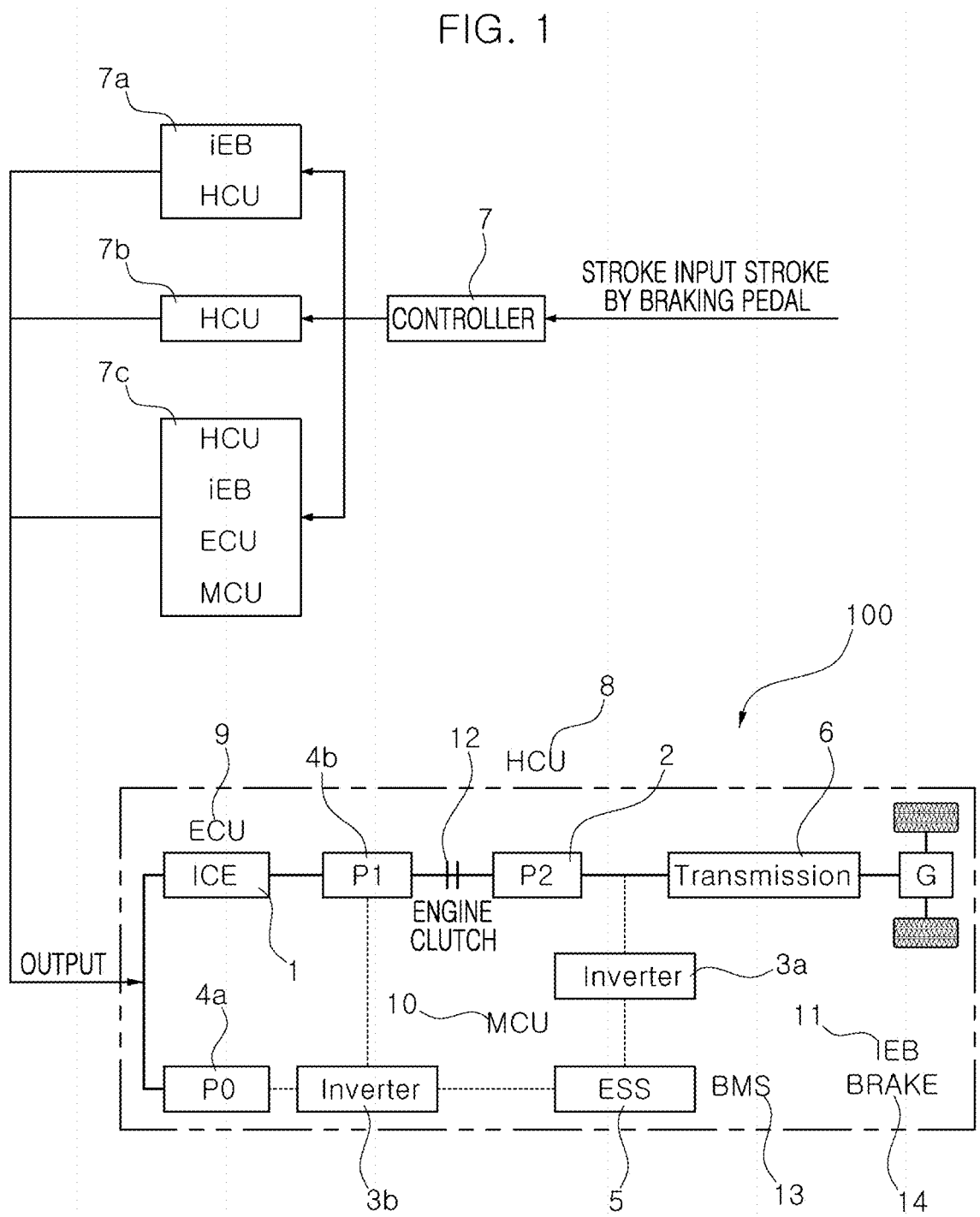
FIG. 1 is a block diagram illustrating a hybrid vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An exemplary embodiment of the present disclosure is in detail described below with reference to the accompanying drawings. The exemplary embodiment of the present disclosure is exemplary and may be practiced in various forms by a person of ordinary skill in the art to which the present disclosure pertains. Therefore, the present disclosure is not limited to the exemplary embodiment described below.

With reference to FIG. 1, a hybrid vehicle 100 includes P2, P0, and P1 motors 2, 4a, and 4b, as vehicle powertrain sources, an energy storage system 5, and a transmission 6 for transferring vehicle driving power. The P2 and P1 motors 2 and 4b are connected to an engine clutch 12, and the P0 and P1 motors 4a and 4b are connected to an internal combustion engine (ICE) 1. The energy storage system 5 is connected to two inverters, first and second inverters 3a and 3b, and is controlled by a battery management system (BMS) 13. The transmission 6 is connected to a differential gear unit G which is connected to a wheel of the hybrid vehicle 100 on which a brake 14 is mounted.

The hybrid vehicle 100 is a hybrid vehicle in which power is parallelly transferable.

As an exemplary embodiment of the present disclosure, the ICE 1 is an internal combustion engine that utilizes gasoline or LPG. The P2 motor 2 is a primary drive motor which is directly connected to the transmission 6 and is configured to drive the hybrid vehicle or charge the energy storage system 5. The P0 motor 4a and the P1 motor 4b are directly connected to the ICE 1 and operate as a hybrid starter and generator. The engine clutch 12 is configured to control transfer of the vehicle driving power between the ICE 1 and the P2 motor 2 by performing engaging and disengaging operations.

As an exemplary embodiment of the present disclosure, the energy storage system 5 is a battery. The first inverter 3a is configured to convert electric power between the P2 motor 2 and the energy storage system 5. The second inverter 3b is configured to convert electric power between each of the P0 and P1 motors 4a and 4b and the energy storage system 5. The BMS 13 manages a state of charge (SOC) by controlling the energy storage system 5.

As an exemplary embodiment of the present disclosure, the transmission 6 is a multi-range transmission. The transmission 6 multiplies vehicle driving power generated in the ICE 1, the P2 motor 2, or the like by utilizing gear ratio and transfers the resulting vehicle driving power to the wheel through the differential gear unit G.

Moreover, the hybrid vehicle 100 includes a controller 7, and the controller 7 is configured with a hybrid control unit (HCU) 8, an engine control unit (ECU) 9, a motor control unit (MCU) 10, and an integrated electric booster (iEB) 11.

As an exemplary embodiment of the present disclosure, the HCU 8 is a highest-level control unit that is configured to perform overall control of hybrid low-level units and is configured to control the ECU 9, the MCU 10, the iEB 11, and the BMS 13 that are low-level control units. The ECU 9 is an engine control unit which is configured to control the ICE 1, the MCU 10 is a motor controller that is configured to control the P2, P0, and P1 motors 2, 4a, and 4b, and the iEB 11 is an integrated electric booster regenerative braking system.

The controller 7 is configured with a determination unit 7a, a computation unit 7b, and a drive unit 7c as a high-level control unit and a low-level control unit and is configured to perform control of charging by a motor to improve fuel efficiency.

As an exemplary embodiment of the present disclosure, the determination unit 7a is configured with the HCU 8 and the iEB 11 that is configured to perform determination control (S10). In the determination control, from a torque required for braking which is determined by the iEB 11 from an amount of force applied to a brake pedal due to stroke input by a brake pedal operation, it is determined whether an engine clutch 12 is engaged or disengaged, and power of the ICE 1, and power of each of the P2, P0, and P2 motors 2, 4a, and 4b are determined.

As an exemplary embodiment of the present disclosure, the computation unit 7b is configured with the HCU 8 that is configured to perform computation control (S20). In the computation control, the ICE 1, the engine clutch 12, and each of the P2, P0, and P1 motors 2, 4a, and 4b are controlled in accordance with α, β, and γ that are motor control boundary values.

As an exemplary embodiment of the present disclosure, the drive unit 7c is configured with the HCU 8, the ECU 9, the MCU 10, and the iEB 11 that perform drive control (S30). In the drive control, the HCU 8 determines power for performing regenerative braking and generates an engine clutch control command, the ECU 9 is configured to control an engine output torque, the MCU 10 generates a motor torque command, and the iEB 11 generates a final hydraulic pressure braking command.

Figure 2:
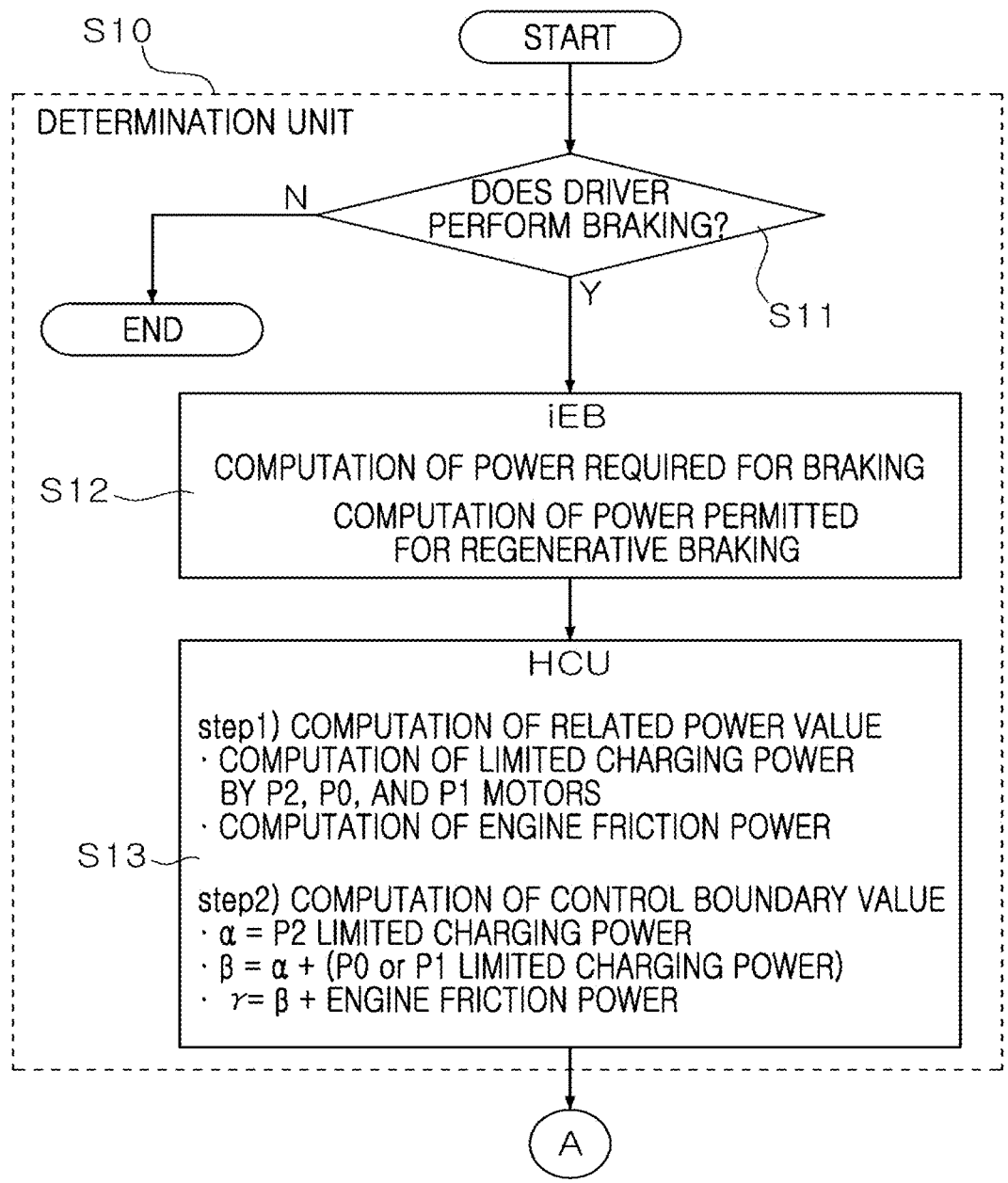
FIGS. 2, 3, and 4 are flowcharts each illustrating a method of controlling charging by a motor to improve fuel efficiency of the hybrid according to an exemplary embodiment of the present disclosure.
Figure 3:
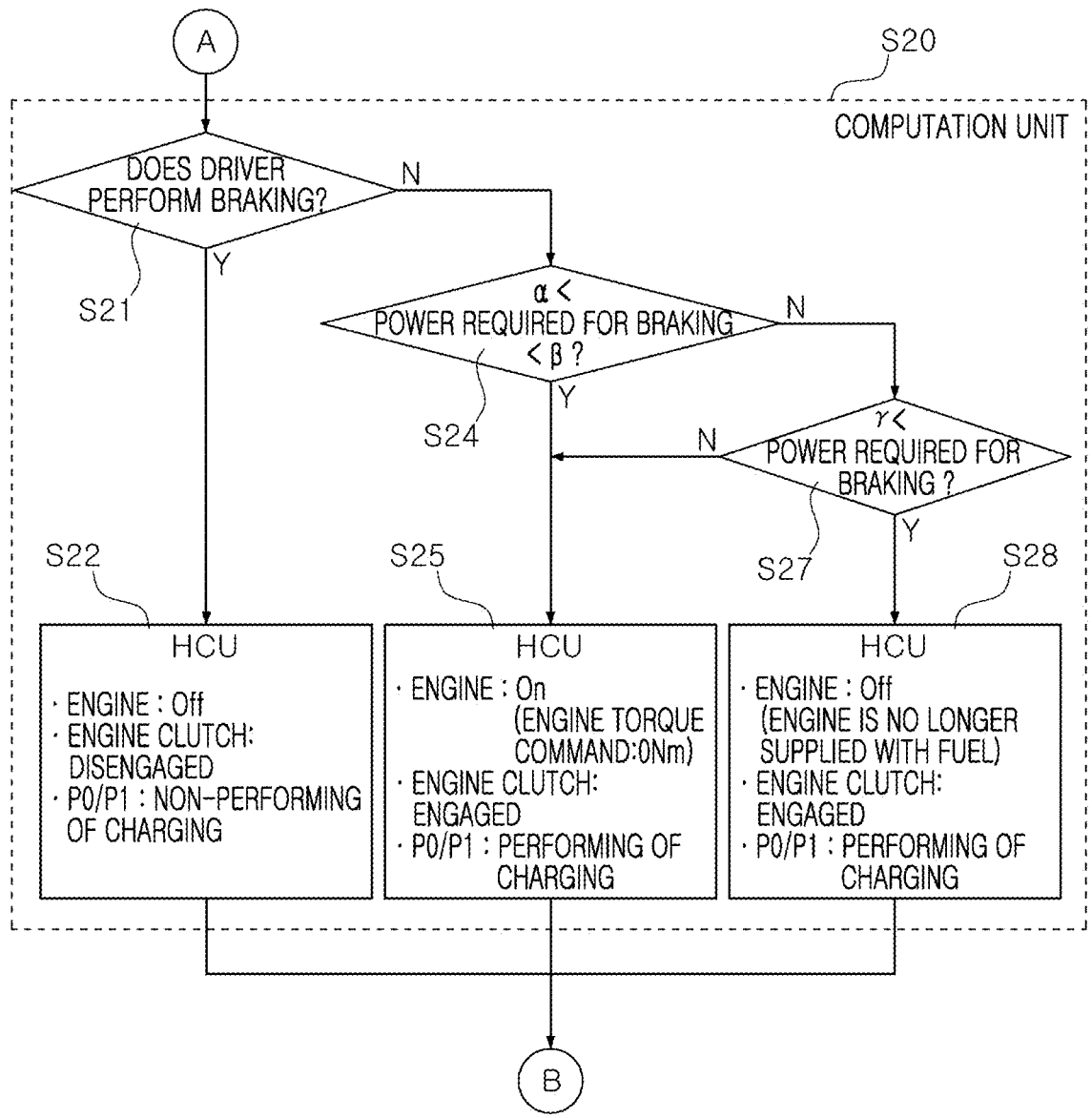
Figure 4:
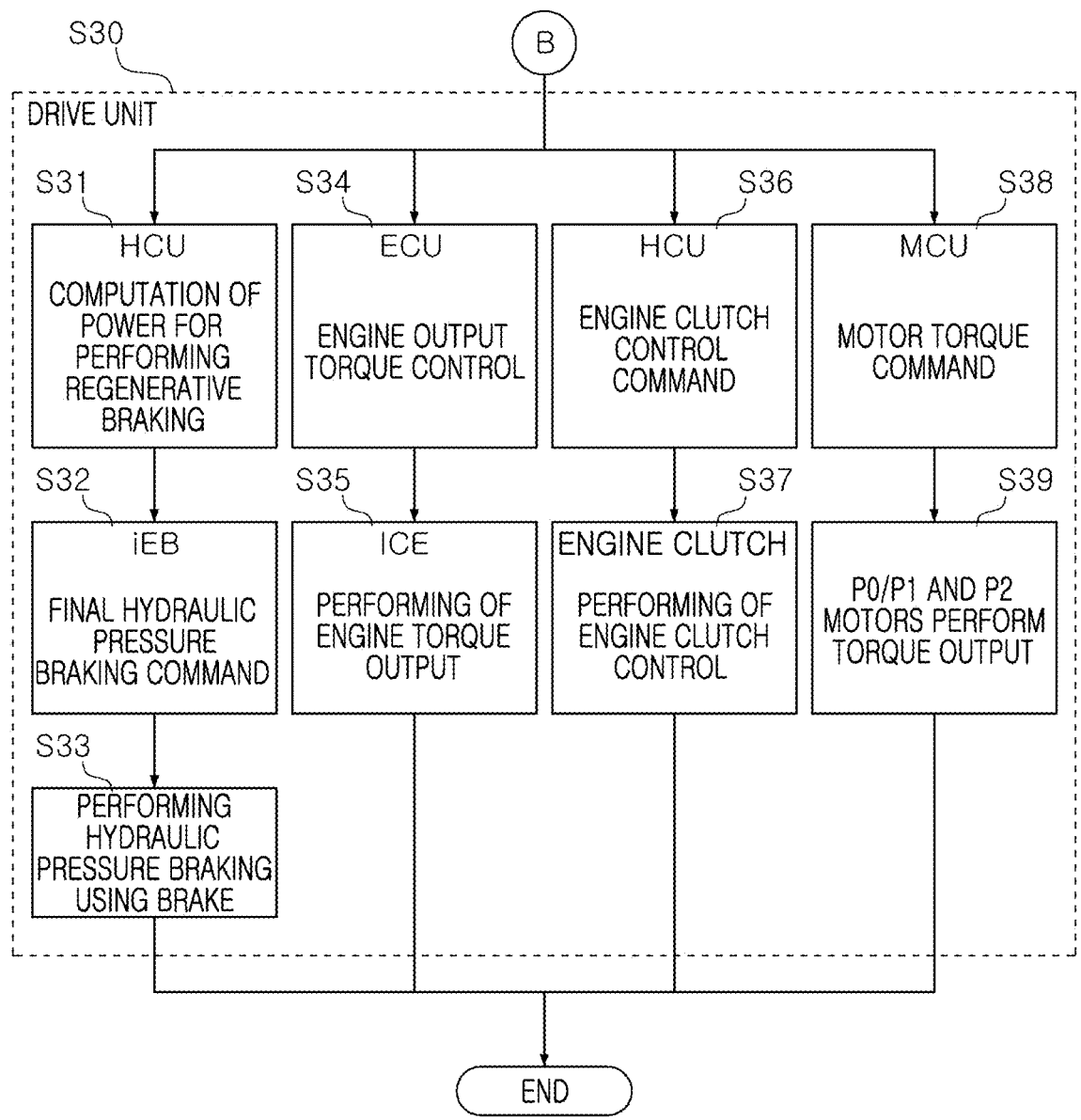

With reference to FIGS. 2, 3, and 4, in a method of controlling charging by a motor to improve fuel efficiency of the hybrid vehicle 100, through the determination control in S10, limited charging power by each of the P2, P0, and P1 motors 2, 4a, and 4b and engine friction power that are based on power required for the braking and power permitted for regenerative braking are determined when braking the hybrid vehicle 100, and the motor control boundary values that apply for optimization of motor control on a per-deceleration level basis are categorized into α, β, and γ. Through the computation control in S20, in accordance with α, β, and γ that are the control boundary values, it is determined whether or not the ICE 1 is turned on or off, it is determined whether the engine clutch 12 is engaged or disengaged, and it is determined whether or not the P1 and P2 motors 4a and 4b, along with the P0 motor 2 perform charging. Through the drive control in S30, one or more of hydraulic pressure braking using the brake 14, engine torque output, engine clutch control, and motor torque output are performed in accordance with α, β, and γ that are the control boundary values.

Therefore, with the method of controlling charging by a motor to improve the fuel efficiency of the hybrid vehicle 100, in the hybrid vehicle provided with the P0 and P1 motors 4a and 4b, and the P2 motor 2 which is a primary motor, regenerative braking energy recovery is optimized by control of charging by the P0 motor 4a, control of charging by the P1 motor 4b and an engine, or P0 and control of charging by the P0 and P1 motors 4a and 4b according to a level of a power required for braking that exceeds possible charging power by the P2 motor. Thus, a limitation of an existing technique in which the P0 and P1 motors 4a and 4b are provided, but is used only for hydraulic pressure braking without being fully utilized is overcome. Recovering regenerative braking energy which is consumed for the hydraulic pressure braking may be recovered for use in the P2, P0, and P1 motors 2, 4a, and 4b, improving the fuel efficiency.

The method of controlling charging of a motor to improve the fuel efficiency of the hybrid vehicle 100 will be described in detail below with reference to FIG. 5, FIG. 6, FIG. 7, FIG. 8, and FIG. 9.

First, the determination unit 7a is configured to perform the determination control in S10 that includes a sub-step S11 of confirming the intention of a driver to perform braking, a sub-step S12 of determining the power required for braking and the power permitted for regenerative braking, and a sub-step S13 of determining a power value that corresponds to the limited charging power by each of the P2, P0, and P1 motors 2, 4a, and 4b and a power value that corresponds to the engine friction power.

For example, the iEB 11 determines the possible power permitted for regenerative braking from the power required for braking determined in accordance with the amount of force applied to the brake pedal (S11) that reflects the intention of the driver to perform braking (S12).

As an exemplary embodiment of the present disclosure, the HCU 8 determines the power value that corresponds to the limited charging power by each of the P2, P0, and P1 motors 2, 4a, and 4b and the power value that corresponds to the engine friction power of the ICE 1, and the control boundary values for the power permitted for regenerative braking, using the determined power values (S13).

Equation for Computing the Control Boundary Value $\alpha$=P2 Limited Charging Power $\beta$=$\alpha$+(P0 limited charging power or P1 limited charging power)

$\gamma$=$\beta$+Engine Friction Power (1)

Figure 5:
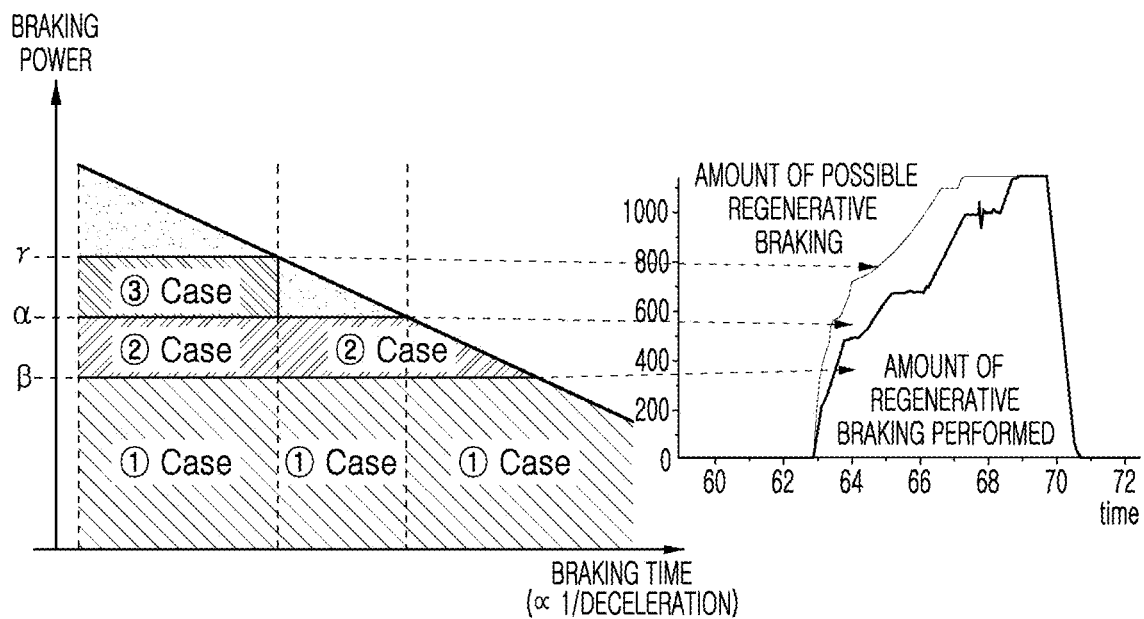
FIG. 5 is a graph of braking power as a function of braking time, which shows power for braking (that is, an amount of force applied to a brake pedal) which is required by a driver of the hybrid vehicle according to an exemplary embodiment of the present disclosure.

FIG. 5 is a graph of braking power as a function of braking time, which shows that the control boundary value represents power required by the driver for braking.

As shown in FIG. 5, the more increased the power required by the driver for braking (that is, the amount of force applied to the brake pedal), the larger deceleration tends to be and the more shortened braking time tends to be. Conversely, the more decreased the power required by the driver for braking, the more lengthened the braking time tends to be.

Therefore, the hybrid vehicle in which power is parallelly transferable includes the feature that the P2, P0, and P1 motors 2, 4a, and 4b and the like has respective charging limitation power. Therefore, from a relationship between the braking power and the braking time, it may be seen that division into cases 1, 2, and 3 is made of according to a braking power level and that the optimization of the regenerative braking energy is possible through selection on a per-control case basis.

As an exemplary embodiment of the present disclosure, the case 1 indicates an amount of regenerative braking performed by the P2 motor 2, and cases 2 and 3 indicate an amount of additional regenerative braking which is obtainable to an extent between the amount of regenerative braking performed and an amount of possible regenerative braking.

Subsequently, the computation unit 7b is configured to perform the computation control in S20 that includes sub-steps S21 to S22 of applying the case 1 for regenerative braking, sub-steps S24 to S25 of applying the case 2 for regenerative braking, and sub-steps S27 to S28 of applying the case 3 for regenerative braking.

As an exemplary embodiment of the present disclosure, the case 1 for regenerative braking (S21 to S22), the case 2 for regenerative braking (S24 to S25, and the case 3 for regenerative braking (S27 to S28) are applied under the following conditions for applying Cases 1, 2, and 3, respectively.

Equations Relating to the Conditions for Applying Cases 1, 2, and 3

Case 1: Power Required for Braking<$\alpha$

Case 2: $\alpha$<Power Required for Braking<$\beta$

Case 3: $\gamma$<Power Required for Braking (2)

As a result, as in S21, the HCU 8 is configured to determine that this corresponds to the case 1 for regenerative braking in a case where the "power required for braking" is less than the "charging limitation power α for the P2 motor 2." Moreover, as in S22, for example, the HCU 8 is configured to determine that the ICE 1 has to be turned off and that the engine clutch 12 has to be disengaged, and that the P0 motor 4a and the P1 motor 4b does not have to perform P0 and P1 charging.

As in S24, in a case where the "power required for braking" is equal to or greater than the limited charging power α by the P2 motor 2, but less than a "sum β of [the limited charging power α by the P2 motor 2 and (the charging limitation power for the P0 or P1 motor 4a or 4b)]", the HCU 8 is configured to determine that this corresponds to the casing 2 for regenerative braking. Moreover, for example, the HCU 8 is configured to determine that the ICE 1 has to produce an engine torque of 0 Nm in a state of being turned on, that the engine clutch 12 has to be engaged, and that the P0 motor 4a and the P1 motor 4b have to perform the P0 and P1 charging.

Furthermore, as in S27, in a case where the "power required for braking" is equal to or greater than a "sum γ of [(the sum β of (the limited charging power α by the P2 motor 2) and (the limited charging power by the P0 or P1 motor 4a or 4b)) and the engine friction power]," the HCU 8 is configured to determine that this corresponds to the case 3 for regenerative braking. Moreover, in S29, for example, the HCU 8 is configured to determine that the ICE 1 no longer has to be supplied with fuel in a state of being turned off, that the engine clutch 12 is engaged, and P0 motor 4a and the P1 motor 4b have to perform the P0 and P1 charging.

Finally, the drive unit 7c is configured to perform the drive control in S30 based on each of Cases 1, 2, and 3 for regenerative braking, and is configured to perform brake control in S31 to S33, ICE control in S34 and S35, the engine clutch control in S36 and S37, and the motor control in S38 and S39 that are suitable for each of Cases 1, 2, and 3 for regenerative braking.

As an exemplary embodiment of the present disclosure, in the brake control (S31 to S33), the HCU 8, as in S31, determines power for performing regenerative braking. Moreover, the iEB 13, as in S32, generates a hydraulic pressure braking command to compensate for a shortage that occurs due to the insufficient power for performing regenerative braking, and as in S33, causes the brake 14 to perform hydraulic pressure braking.

With reference to FIG. 5, the power for performing the regenerative braking (S32) means the case 1 for regenerative braking to which the condition "power required for braking<α" applies, the case 2 for regenerative braking to which the condition "power required for braking<β" applies and the case 3 for regenerative braking to which the condition "γ<power required for braking" applies. Moreover, the hydraulic pressure power (S32) is a shortage of the brake power that cannot be compensated for in the case 2 for regenerative braking to which the condition "α<power required for braking<β" applies and the case 3 for regenerative braking to which the condition "γ<power required for braking" applies.

As an exemplary embodiment of the present disclosure, in the ICE control (S34 and S35), as in S34, the ECU 9 generates an engine output torque control command, and as in S35, causes the ICE 1 to perform engine torque output.

Therefore, the engine output torque control (S34) means the engine torque of 0 Nm that results from turning on the ICE 1 in the case 2 for regenerative braking to which the condition "α<the power required for braking<β" applies, and is not performed in the case 1 for regenerative braking in which the ICE 1 is turned on and to which the condition "power required for braking<α" applies and the case 3 for regenerative braking to which the condition "γ<power required for braking" applies.

As an exemplary embodiment of the present disclosure, in the engine clutch control (S36 and S37), as in S36, the HCU 8 generates the engine clutch control command, and as in S37, causes the engine clutch 12 to perform the engine clutch control.

Therefore, in the engine clutch control (S36), the engine clutch 12 is engaged in the case 2 for regenerative braking to which the condition "α<power required for braking<B" applies and the case 3 for regenerative braking to which the condition "γ<power required for braking" applies. However, the engine clutch 12 is disengaged in the case 1 for regenerative braking to which the condition "power required for braking<α" applies.

As an exemplary embodiment of the present disclosure, in the motor control (S38 and S39), as in S38, the MCU 10 generates the motor torque command for the P2, P0, P1 motors 2, 4a, and 4b and as in S39, causes the P2, P0, P1 motors 2, 4a, and 4b to perform the motor torque command. In the instant case, the motor torque output of the P2, P0, P1 motors 2, 4a, and 4b means the regenerative braking.

Therefore, the motor torque (S38) is applied to only the P2 motor 2 because the P0 and P1 motors 4a and 4b do not perform the P0 and P1 charging in the case 1 for regenerative braking to which the condition "power required for braking<α" applies, but is applied to all the P2 motor 2, the P0 motor 4a, and/or the P1 motor 4b because the P0 and P1 motors 4a and 4b perform charging in the case 2 for regenerative braking to which the condition "α<the power required for braking<β" applies and the case 3 for regenerative braking to which the condition "γ<power required for braking" applies.

FIG. 6, FIG. 7, FIG. 8, and FIG. 9 illustrate an example where the hybrid vehicle 100 operates based on each of Cases 1, 2, and 3 for regenerative braking.

With reference to the case 1 for regenerative braking in FIG. 6, because the hybrid vehicle 100 satisfies the entry condition "power required for braking<α," the hybrid vehicle 100 is configured to perform control so that the ICE 1 is turned off, that the engine clutch 12 is disengaged, and that the P0 and P1 motors 4a and 4b does not perform charging. The P2 motor 2 is configured to perform charging for the energy storage system 5.

Therefore, when the power required for braking is low, the regenerative braking energy is recovered through only the P2 motor 2.

With reference to the case 2 for regenerative braking in FIG. 7, because the hybrid vehicle 100 satisfies the entry condition "α<power required for braking<β," the hybrid vehicle 100 is configured to perform control so that the ICE 1 produces an output torque of 0 Nm in a state of being turned on, that the engine clutch 12 is engaged, that the P2 motor 2 is configured to perform charging, and that the P0 or/and P1 motors 4a or/and 4b perform P0, P1, or P0 and P1 charging. P2 and P0, P2 and P1, or P2, P0, and P1 charging is performed for the energy storage system 5. In a case where the condition "power required for braking>(charging power by P2, P0, and P2 motors 2, 4a, and 4b)" is satisfied, insufficient power required for braking is compensated for by iEB 11 performing hydraulic pressure braking that utilizes the brake 14.

Therefore, when the power required for braking is at a middle level, the regenerative braking energy is recovered through the P2 motor 2 and the P0 and P1 motors 4a and 4b (P0 motor 4a, P1 motor 4b, or the P2 and P0 motors 2 and 4a).

Figure 8:
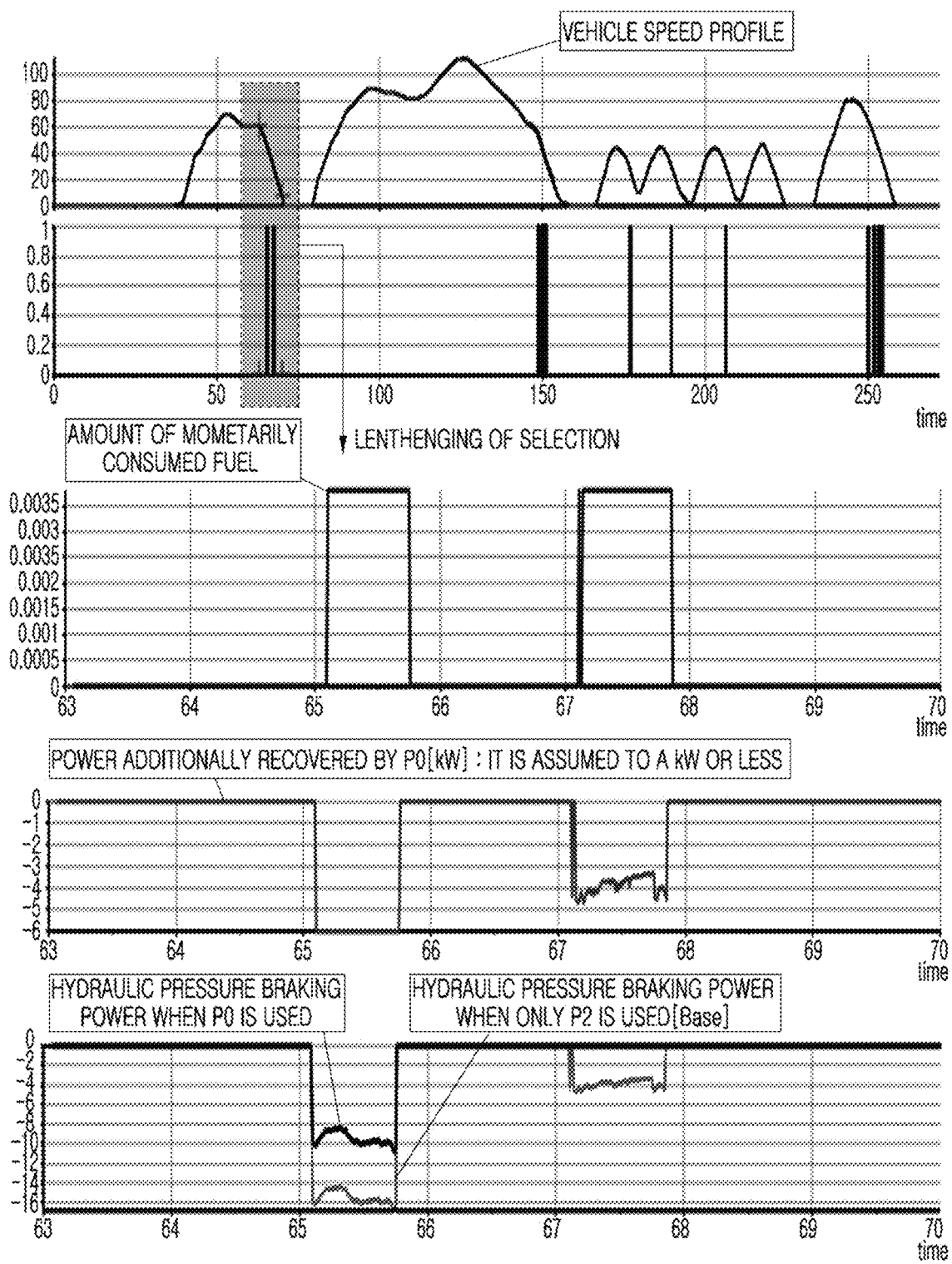
FIG. 8 is graphs each showing a state of regenerative braking by the P2 and P0 motors when compared with a fuel amount consumed by an engine in the case 2 for control of charging by a motor when the hybrid vehicle according to an exemplary embodiment of the present disclosure performs braking.

With reference to the engine control in the case 2 for regenerative braking in FIG. 8, in a state where the engine clutch 12 is engaged, additional energy recovery is possible because the braking power is transferable up to the P0 motor 4a or the P1 motor 4b through the P2 motor 2. However, because engine fuel consumption is also kept minimized, the ICE 1 is configured to perform control to produce an output of 0 Nm in such a manner to cope with only the engine friction occurring in the ICE 1.

As illustrated, the ICE 1 consumes fuel due to "the engine clutch engagement and the output of 0 Nm" in a deceleration section in a vehicle speed profile, but the result of the test analysis shows that additional recovery power of about 6 kW(a) by the P0 motor 4a is secured because the P0 motor 4a performs charging and that the fuel efficiency is improved by 0.56 to 0.61% because a ratio of increasing fuel consumption stops at 0.01% and the P0 motor 4a contributes to the regenerative braking energy recovery.

In the present manner, in the case 2 for regenerative braking to which the condition "α<power required for braking<β" applies, a fuel efficiency gain is achieved with an electrical energy which is additionally recovered through the P0 and P1 motors 4a and 4b separately from the P2 motor 2 is achieved, when compared with the fuel consumption by the ICE 1.

With reference to the case 3 for regenerative braking in FIG. 9, the hybrid vehicle 100 satisfies the entry condition "power required for braking<α." The hybrid vehicle 100 is configured to perform control so that the ICE 1 is turned off in such a manner the ICE 1 is no longer supplied with fuel in a state of being turned off, that the engine clutch 12 is engaged, that the P2 motor 2 performs charging, and that the P0 or/and P1 motors 4a or/and 4b perform P0, P1, or/and P0 and P1 charging. The regenerative braking energy is recovered by performing the P2 and P0, P2 and P1, or the P2, P0 and P1 charging for the energy storage system 5 and by the engine friction power. In a case where the condition "power required for braking>(charging power by the P2, P0, and P1 motors 2, 4a, and 4b and engine friction power)" applies, insufficient power required for braking is compensated for by the iEB 11 through the hydraulic pressure braking that utilizes the brake 14.

Therefore, when braking at a high deceleration level is required, the regenerative braking energy is recovered through "the P2 motor 2, the P0 and P1 motors 4a and 4b [P0, P1, or P0 and P2], and the engine friction power." In a state where the power required for braking is high, charging with regenerative braking energy is possible by utilizing all available P2, P0, and P1 motors 2, 4a, and 4b. Moreover, the ICE 1 does not additionally consume fuel. The advantage of improving the fuel efficiency is achieved.

As described above, in the method of controlling charging by a motor to improve the fuel efficiency of the hybrid vehicle 100 According to the exemplary embodiment of the present disclosure, when the driver performs braking (S11), the iEB 11 determines the power required for braking and the power permitted for regenerative braking. Moreover, the HCU 8 selectively combines turning-on of the ICE 1, turning-off of the ICE 1, engagement of the engine clutch 12, disengagement of the engine clutch 12, non-performing of charging by the P0 and the P1 motors, and performing of charging by the P0 and the P1 motors, in accordance with the condition "α=P2 limited charging power" in the case 1, the condition "β=α+(P0 limited charging power or P1 limited charging power)" in the case 2, and the condition "γ=β+engine friction power" in the case 3. The cases 1, 2, and 3 are distinguished from each other by combinations of respective P2, P0, and P1 limited charging power by the P2, P0, and P1 motors 2, 4a, and 4b and the engine friction power. in accordance with the power for performing the regenerative braking which is determined by the HCU 8, the HCU 8 is configured to perform control that engages and disengages the engine clutch 12, the iEB 11 is configured to perform hydraulic pressure braking control of the brake 14, the ECU 9 is configured to perform engine torque output control of the ICE 1, and the MCU 10 is configured to perform motor torque output control of the P2, P0, and P1 motors 2, 4a, and 4b. Control of the charging by each of the P2, P0, and P1 motors 2, 4a, and 4b is optimized by variable control on a per-deceleration level basis that varies with a level of the power required for braking. Thus, the regenerative braking energy which is consumed for the hydraulic pressure braking is maximally recovered.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of at least one of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling charging by a motor to improve fuel efficiency of a hybrid vehicle, the method comprising:
   selecting a control boundary value based on limited charging power by each of first, second and third motors, the second motor and the third motor being connected to an engine clutch and the first motor and the second motor being connected to an internal combustion engine (ICE) during braking of the hybrid vehicle and
   determining whether the first motor, the second motor, or the third motor performs the charging, according to the selected control boundary value,
   wherein a hybrid control unit (HCU) determines the control boundary value by use of equations:

$\alpha = P2$ Limited Charging Power of the third motor, $\beta = \alpha + (P0$ limited charging power of the first motor or $P1$ limited charging power of the second motor), $\gamma = \beta +$ Engine Friction Power, Power Required for Braking $< \alpha$, $\alpha <$ Power Required for Braking $< \beta$, $\gamma <$ Power Required for Braking.

2. The method of claim 1, wherein the control boundary value is selected based on power required for the braking and power permitted for regenerative braking that are determined by an integrated electric booster (iEB).

3. The method of claim 1, wherein the control boundary value is determined by a combination of at least one of limited charging power by the third motor (P2 limited charging power), limited charging power by the first motor (P0 limited charging power), limited charging power by the second motor (P1 limited charging power), and engine friction power, and the hybrid control unit (HCU) considers the determined control boundary value to be at a level of acceleration.

4. The method of claim 1, wherein the determining of whether the first motor, the second motor, or the third motor performs the charging includes:
   categorizing the control boundary value as "$\alpha = P2$ limited charging power" in a case 1 and selectively combining at least one of turning-on of the ICE, turning-off of the ICE, engagement of the engine clutch, disengagement of the engine clutch, non-performing of the charging by the first motor and the second motor, and performing of the charging by the first motor and the second motor, in accordance with the case 1; and
   performing one of determination of a power for performing regenerative braking, hydraulic pressure braking, an engine torque output, engine clutch control, and motor torque output, in accordance with the case 1.

5. The method of claim 4, wherein in the case 1, the HCU is configured to apply turning-off of the ICE, disengagement of the engine clutch, and non-performing of the first motor and the second motor, as a selected combination.

6. The method of claim 5, wherein in the case 1, the HCU is configured to determine a power for performing regenerative braking, in accordance with "$\alpha = P2$ limited charging power,"
   wherein an integrated electric booster (iEB) is configured to determine that a shortage occurring due to an insufficient power for performing the regenerative braking is compensated for through final hydraulic pressure braking, and is configured to perform the final hydraulic pressure braking using a brake, and
   wherein a motor control unit (MCU) is configured to perform the control of motor torque output by the third motor.

7. The method of claim 1, wherein the determining of whether the first motor, the second motor, or the third motor is configured to perform the charging includes:

categorizing the control boundary value as "β=α+(P0 limited charging power or P1 limited charging power) in a case 2 and selectively combining at least one of turning-on of the ICE, turning-off of the ICE, engagement of the engine clutch, disengagement of the engine clutch, non-performing of the charging by the first motor and the second motor, and performing of the charging by the first motor and the second motor, in accordance with the case 2; and performing one of determination of a power for performing regenerative braking, hydraulic pressure braking, engine torque output, engine clutch control, and motor torque output, in accordance with the case 2.

8. The method of claim 7, wherein in the case 2, the HCU is configured to apply the turning-on of the ICE, the engagement of the engine clutch, and the performing of the charging by the first motor and the second motor as a selected combination.

9. The method of claim 8, wherein in the case 2, the HCU is configured to determine the power for performing the regenerative braking, in accordance with "β=α+(P0 limited charging power or P1 limited charging power), wherein an iEB is configured to determine that a shortage occurring due to an insufficient power for performing the regenerative braking is compensated for through a final hydraulic pressure braking and performs the final hydraulic pressure braking using a brake, wherein an engine control unit (ECU) is configured to perform engine output torque control, and thus the international combustion engine (ICE) performs the engine torque output, wherein the HCU is configured to perform the engine clutch control so that the engine clutch is engaged, and wherein a motor control unit (MCU) causes the first motor, the second motor, and the third motor to perform the motor torque output.

10. The method of claim 7, wherein in the case 2, an engine control unit (ECU) is configured to control the international combustion engine (ICE) so that the ICE produces an engine torque of 0 Nm in a state of being turned on.

11. The method of claim 1, wherein the determining of whether the first motor, the second motor, or the third motor performs the charging includes:

categorizing the control boundary value as "γ=β+engine friction power" in a case 3 and selectively combining at least one of turning-on of the ICE, turning-off of the ICE, engagement of the engine clutch, disengagement of the engine clutch, non-performing of the charging by the first motor and the second motor, and performing of the charging by the first motor and the second motor, in accordance with the case 3; and performing one of determination of a power for performing regenerative braking, hydraulic pressure braking, engine torque output, engine clutch control, and motor torque output, in accordance with the case 3.

12. The method of claim 11, wherein in the case 3, the HCU is configured to apply the turning-off of the ICE, the engagement of the engine clutch, the performing the charging by the first motor and the second motor, as a selected combination.

13. The method of claim 12, wherein in the case 3, the HCU is configured to determine the power for performing the regenerative braking, in accordance with "γ=β+engine friction power,"

wherein an iEB is configured to determine that a shortage occurring due to an insufficient power for performing the regenerative braking is compensated for through a final hydraulic pressure braking and is configured to perform the final hydraulic pressure braking using a brake, wherein the HCU is configured to perform the engine clutch control, and thus the engine clutch is engaged, and wherein a motor control unit (MCU) causes the first motor, the second motor, and the third motor to perform the motor torque output.

14. The method of claim 12, wherein in the case 3, an engine control unit (ECU) is configured to control the international combustion engine (ICE) so that the ICE is no longer supplied with fuel in a state of being turned off.

15. A hybrid vehicle comprising:

a third motor directly connected to a transmission and configured to perform charging when the hybrid vehicle decelerates;

first and second motors directly connected to an international combustion engine (ICE);

an integrated electric booster (iEB) configured to compute power required for braking and power permitted for regenerative braking during the braking;

a hybrid control unit (HCU) configured to select non-performing of the charging by the first motor and the second motor or performing of the charging by the first motor and the second motor according to a level of deceleration of the hybrid vehicle that varies with braking power and braking time, to determine the power for performing the regenerative braking, and to control an engine clutch;

an engine control unit (ECU) configured to the ICE; and a motor control unit (MCU) configured to control the performing of the charging by the third motor and the performing of the charging by the first motor and the second motor through motor torque output, wherein for determining whether the first motor, the second motor, or the third motor performs the charging, the HCU determines a control boundary value by use of equations:

$\alpha = P2$ Limited Charging Power of the third motors, $\beta = \alpha + (P0$ limited charging power of the first motors or $P1$ limited charging power of the second motors), $\gamma = \beta +$ Engine Friction Power, Power Required for Braking $\leq \alpha$, $\alpha <$ Power Required for Braking $\leq \beta$, $\gamma <$ Power Required for Braking.

16. The hybrid vehicle of claim 15, wherein the iEB is configured to perform hydraulic pressure braking using a brake to compensate for a shortage that occurs due to an insufficient power for performing the regenerative braking using the brake.

17. The hybrid vehicle of claim 15, wherein the HCU combines limited charging power by the third motor (P2 limited charging power), limited charging power by the first motor (P0 limited charging power), limited charging power by the second motor (P1 limited charging power), and engine friction power, and categorizes a combination thereof as one of "α=P2 limited charging power" in a case 1, "β=α+(P0 limited charging power or P1 limited charging power)" in a case 2, and "γ=β+engine friction power" in a case 3, and wherein the HCU is configured to determine the non-performing of the charging by the first motor and the second motor or the performing of the charging by the first motor and the second motor by selectively combining turn-on of the ICE, turning-off of the ICE, engagement of the engine clutch, and disengagement of the engine clutch according to each of the cases 1, 2, and 3.

18. The hybrid vehicle of claim 17, wherein, in the case 1, the HCU is configured to apply the turning-off of the ICE, the disengagement of the engine clutch, and the non-performing of the first motor and the second motor, as a selected combination, and wherein the power for performing the regenerative braking is recovered as regenerative braking energy by the third motor, and an energy storage system is charged with the recovered regenerative braking energy.

19. The hybrid apparatus of claim 17, wherein in the case 2, the HCU is configured to apply the turn-on of the ICE, the engagement of the engine clutch, and the performing of the charging by the first motor and the second motor, as a selected combination, and wherein, in addition to recovery of regenerative braking energy by the third motor, the power for performing the regenerative braking is recovered as the regenerative braking energy by one of the first motor, the second motor, and a combination of the first motor and the second motor, and an energy storage system is charged with the recovered regenerative braking energy, and wherein the ECU is configured to control the ICE so that the ICE produces an engine torque of 0 Nm in a state of being turned on.

20. The hybrid apparatus of claim 17, wherein in the case 3, the HCU is configured to apply the turning-off the ICE, the engagement of the engine clutch, and the performing of the charging by the first motor and the second motor, as a selected combination, wherein, in addition to recovery of the regenerative braking energy by the third motor, the power for performing the regenerative braking is recovered as the regenerative braking energy by one of the first motor, the second motor, and a combination of the first motor and the second motor, and an energy storage system is charged with the recovered regenerative braking energy, and wherein the ECU is configured to control the ICE so that the ICE is not supplied with fuel in a state of being turned off.

* * * * *